(12) United States Patent
Jaurand

(10) Patent No.: US 8,985,519 B2
(45) Date of Patent: *Mar. 24, 2015

(54) LOAD-CARRYING SYSTEM FOR TRANSPORT AEROPLANE

(75) Inventor: Benoit Jaurand, Vanves (FR)

(73) Assignee: MBDA France, Paris (FR)

( * ) Notice: Subject to any disclaimer, the term of this patent is extended or adjusted under 35 U.S.C. 154(b) by 101 days.

This patent is subject to a terminal disclaimer.

(21) Appl. No.: 13/574,457

(22) PCT Filed: Jan. 19, 2011

(86) PCT No.: PCT/FR2011/000034
§ 371 (c)(1),
(2), (4) Date: Jul. 20, 2012

(87) PCT Pub. No.: WO2011/092397
PCT Pub. Date: Aug. 4, 2011

(65) Prior Publication Data
US 2012/0292444 A1    Nov. 22, 2012

(30) Foreign Application Priority Data
Jan. 26, 2010 (FR) ..................... 10 50488

(51) Int. Cl.
*B64C 1/22* (2006.01)
*B64D 1/02* (2006.01)
*B64C 39/02* (2006.01)

(52) U.S. Cl.
CPC ............... *B64D 1/02* (2013.01); *B64C 39/024* (2013.01); *B64C 2201/082* (2013.01); *B64C 2201/206* (2013.01)
USPC ..................... 244/137.1; 244/136; 244/118.1; 89/1.59; 89/1.51

(58) Field of Classification Search
CPC ............... B64C 1/22; B64D 1/06; B64D 7/00
USPC .................. 244/137.1, 137.3, 136, 118.1, 63; 89/1.51, 1.59
See application file for complete search history.

(56) References Cited

U.S. PATENT DOCUMENTS 3,371,891 A * 3/1968 Brader, Sr. et al. ........ 244/137.3
4,161,301 A    7/1979 Beardsley et al.
(Continued)

FOREIGN PATENT DOCUMENTS

| DE | 10342565 A1 * | 4/2005 | |
| DE | 10342565 A1 * | 4/2005 | ............... B64D 7/08 |
| GB | 1 074 825 A | 7/1967 | |
| GB | 2 292 998 A | 3/1996 | |

OTHER PUBLICATIONS

DE10342565A1, Grabmeier et al.—English Machine Translation.*
(Continued)

*Primary Examiner* — Valentina Xavier
*Assistant Examiner* — Alexander V Giczy
(74) *Attorney, Agent, or Firm* — Klein, O'Neill & Singh, LLP

(57) ABSTRACT

The system comprises an outer container which is fixed, directly and fully, in the hold of the transport aeroplane (AC), and in which there is an inner container that can be moved longitudinally and brought from a first or carrying position in which it is situated fully inside the outer container into a second or off-loading position (P2) in which it is longitudinally offset towards the rear of the aircraft (AC) so that a part of the inner container is then situated outside the transport aeroplane (AC).

16 Claims, 2 Drawing Sheets

(56) References Cited

U.S. PATENT DOCUMENTS

| | | | |
|---|---|---|---|
| 4,256,012 A | | 3/1981 | Cowart et al. |
| 5,763,811 A | | 6/1998 | Ruzicka |
| 6,494,404 B1 | * | 12/2002 | Meyer .................. 244/118.2 |
| 7,093,798 B2 | * | 8/2006 | Whelan et al. ............ 244/120 |
| 7,344,109 B1 | * | 3/2008 | Rezai .................... 244/118.2 |
| 2004/0016846 A1 | * | 1/2004 | Blackwell-Thompson et al. ................... 244/118.1 |
| 2005/0247824 A1 | * | 11/2005 | Allison, Sr. ............. 244/137.2 |
| 2006/0108477 A1 | * | 5/2006 | Helou, Jr. ............... 244/137.1 |

OTHER PUBLICATIONS

International Search Report completed Apr. 27, 2011 and mailed May 6, 2011 from corresponding International Application No. PCT/FR2011/000034 filed Jan. 19, 2011 (3 pages).

Written Opinion completed Apr. 27, 2011 and mailed May 6, 2011 from corresponding International Application No. PCT/FR2011/000034 filed Jan. 19, 2011 (11 pages).

* cited by examiner

LOAD-CARRYING SYSTEM FOR TRANSPORT AEROPLANE

CROSS-REFERENCE TO RELATED APPLICATIONS

This is a national phase application under 35 U.S.C. §371 of PCT Application No. PCT/FR2011/000034 filed Jan. 19, 2011, which claims the benefit of French application No. 1050488, filed Jan. 26, 2010, the contents of each of which are expressly incorporated herein by reference.

FIELD OF ART

The present device, system, and method relate to a load-carrying system for a transport airplane.

BACKGROUND

In the framework of the present device, system, and method, the term load means any object being able to be carried by an airplane, and possibly to be dropped from such airplane. Can be involved particularly drones, freight, etc. Preferably, a load corresponds to a piece of ammunition which, in the framework of the present device, system, and method, represents a missile or bomb type projectile. Generally, such projectile is a part of a usual weapon system with a military load and is equipped with a propelling system and guiding means able to fly it and to guide it toward a target to be damaged or destroyed. It can in particular be a guided bomb or a cruising missile.

Although, non exclusively, the present device, system, and method apply more particularly to a carrying and dropping system in flight, for a military transport airplane, in which missile carrying is performed in the hold of the airplane and dropping is implemented through an opening provided at the rear of the airplane.

Generally, a load-carrying system comprises containers, each of which contains one of more loads.

Such containers are arranged in the hold of the aircraft, either on a fixed position, or on sliding means enabling to move them in the hold. Most frequently, these containers are adapted for the loads to be transported and possibly for the airplane type. Such a carrying system is thus complex with, in general, numerous different containers and numerous connecting means so as to fasten the containers to the airplane fuselage. The complexity is increased if such system must in addition enable a flight dropping of some loads.

This complexity presents numerous disadvantages, particularly a high cost and a large working load to install it and also to restore in the airplane the initial configuration thereof if necessary.

SUMMARY

The present device, system, and method relate to a load-carrying system for a transport airplane, having as an object to remedy the above-mentioned disadvantages.

With this end in view, according to the present device, system, and method, said system of the type comprising at least one so-called internal container which is able to receive at least one load, is remarkable in that it comprises in addition a so-called external container which is able to be fastened, directly and completely, in the hold of the transport airplane, and in that said internal container is arranged within said external container so as to be able to be moved longitudinally and to be brought from one to the other of the following positions:
  a first position, in which it is completely located inside said external container; and
  a second position, in which it is longitudinally offset toward the rear of the aircraft with respect to said first position, so that a part of said internal container is then located outside said external container and outside the transport airplane through an opening at the rear of the hold.

Advantageously, said internal container is mounted inside said external container with the help of the first sliding means which are able to move said internal container between said first and second positions.

So, as thanks to the present device, system, and method, the load-carrying system comprises a single external container which is provided with all the necessary means for the carrying and the off-loading (particularly one or more internal containers and associated sliding means), it is sufficient to install such external container in the airplane to be able to implement the present device, system, and method. Consequently, the system according to the present device, system, and method is simple, it can be realized and installed rapidly, and it does not need a big modification of the transport airplane being used.

Moreover, the present device, system, and method can be envisaged on any type of transport airplane and is not limited to a particular load.

Furthermore, if connecting means of the external container on the internal fuselage of the transport airplane are contemplated, which are easy to be removed, it is possible to restore in the airplane, quickly and at a reduced cost, its initial configuration so that it can fill other types of missions, such as a troop and/or a vehicle transport.

Furthermore, advantageously, the system according to the present device, system, and method comprises in addition a second sliding means which are able to move said load from the load's resting place in one part of the internal container to the part of said internal container that is located outside the transport airplane in said second position.

Moreover, advantageously, said internal container comprises a cage equipped with compartments able to receive a plurality of loads, being identical or different, thereby enabling an operational flexibility. Such compartments can be arranged in rows and/or in columns. In addition, each compartment can longitudinally contain several loads if the respective sizes allow it.

Furthermore, advantageously, said system comprises in addition a control device which is able to control at least said (first and second) sliding means and which is arranged in a dedicated area of the transport airplane, which can be pressurized.

In a preferred embodiment, the system according to the present device, system, and method is provided for carrying, but also for dropping in flight, at least one load. In such preferred embodiment, the part of the internal container, which is located outside the transport airplane in said second position, and in which a load is able to be brought with the help of said second sliding means, is a so-called dropping part, whence the load can be dropped (in flight) from the transport airplane.

So, thanks to this preferred embodiment, the dropping part of the internal container, where a load can be brought, is moved outside the transport airplane, so that this load can then be dropped in flight without using any extraction means, and in particular, with no use of a parachute. The following advantages are then obtained in particular:
- no slowing down of the load after dropping, thereby enabling, in the case of a missile, to stay in the field of pilotability of the missile and of starting of the engine. In such situation, the integration of a missile re-acceleration system is not indispensable;
- no equipment is dropped, unlike a dropping with a parachute, thereby enabling to obtain a certain operational discretion; and
- as the dropping part of the internal container is located outside the transport airplane, the collision risks with the latter are strongly reduced, and a much more extended dropping field is obtained.

In the dropping position, the load is dropped preferably by a simple release. However, in the framework of the present device, system, and method, dropping can also be performed (in such dropping position) by ejection or by ejection and release.

Advantageously, said second sliding means comprises rails fastened on the internal container and provided with an ejection device which is able to slide on said rails and which is able to support the load upon carrying and to release it (by release and/or ejection) upon dropping. So, an ejection device can be used, which is similar to a usual ejection device being used upon carrying and dropping of a piece of ammunition on a fighter. This enables to use the carrying points usually existing on the ammunition and thus limits the modifications to be made to the latter.

Moreover, advantageously:
- the rails are fastened on the internal sides of the internal container so as not to disturb load dropping from an upper stage when the internal container comprises several superposed stages; and
- the system according to the present device, system, and method comprises, for each load, dedicated second sliding means. So, by providing second sliding means adapted for the load type being used, it is possible to carry and drop different types of load with the help of one same internal container, thereby allowing in particular the operational capacities to be increased.

The present device, system, and method also relate to a (military) transport airplane comprising a carrying (and possibly dropping) system such as the one above mentioned.

BRIEF DESCRIPTION OF THE DRAWINGS

The figures of the accompanying drawings will facilitate the understanding of how the present device, system, and method can be implemented. On such figures, identical references designate similar elements.

DETAILED DESCRIPTION

Figure 1:
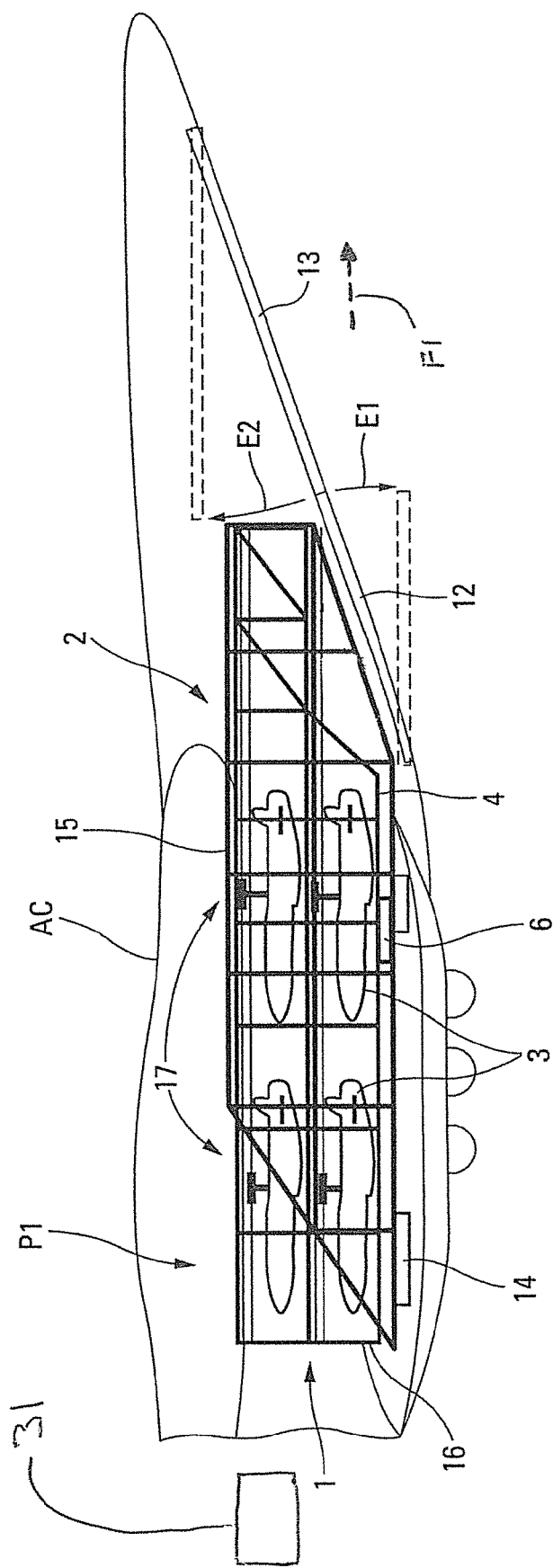
FIGS. 1 and 2 schematically show a system according to the present device, system, and method, which is arranged on a transport airplane, respectively in a carrying position and in an off-loading position, particularly for a flight dropping.
Figure 2:
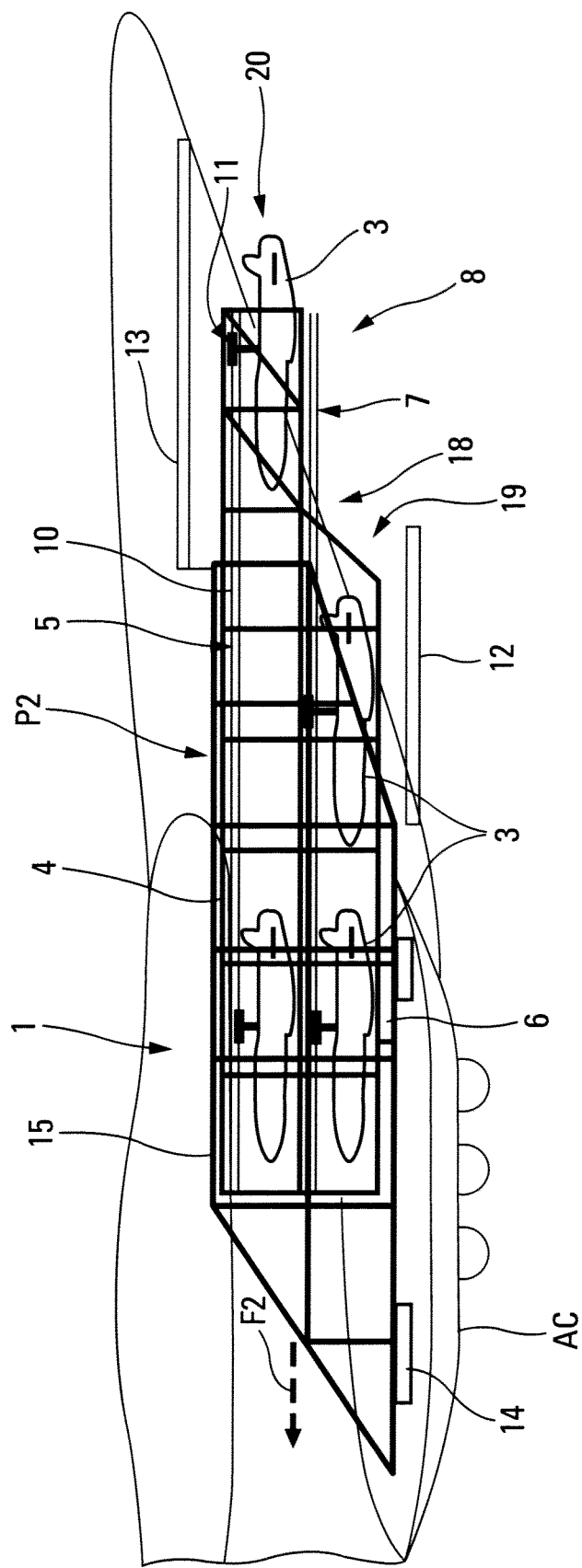

The system 1 according to the present device, system, and method and schematically represented on FIGS. 1 and 2 is adapted to be arranged in the hold 2 of a transport airplane AC, in particular a heavy military transport airplane, and it is used to carry (and possibly to drop in flight) loads representing, as a preferred example, ammunition 3 in the following description.

A piece of ammunition 3 correspond to a projectile which is part of a usual weapon system with a military load and which is equipped with usual propelling means and usual guiding means being able to flight it and to guide it toward a target to be damaged or destroyed. It can be in particular a guided bomb or a cruising missile.

Said system 1 comprises at least one internal container 4 being located in the hold 2 of the transport airplane AC and which is able to receive at least one piece of ammunition 3. In the example of FIGS. 1 and 2, said internal container 4 comprises eight ammunition 3, namely two groups of four ammunition 3, arranged side by side, one only group of which is visible on such FIGS. 1 and 2. Each piece of ammunition 3 is arranged inside the internal container 4 so as to be able to slide with the help of the second sliding means 5 to be detailed more precisely hereinunder.

According to the present device, system, and method, said load-carrying system comprises in addition an external container 15 which is able to be fastened, directly and completely, in the hold 2 of the transport airplane AC. Moreover, according to the present device, system, and method, said internal container 4 is arranged inside said external container 15, and this, to be able to be moved longitudinally in the latter with the help of first sliding means 6 comprising, for example, rails fastened on the external container 15, cooperating with means being integral with the internal container 4.

More precisely, said internal container 4 is able to be brought, with the help of said sliding means 6, from a first or front position P1, which may also be termed a carrying position, represented on FIG. 1, to a second or rear position P2, which may also be termed an off-loading position represented on FIG. 2, in the direction illustrated by an arrow F1, and from such second position P2 again to the first position P1 in the direction illustrated by an arrow F2. Such positions P1 and P2 correspond respectively to:
- a carrying position P1, in which the internal container 4 is completely located inside the external container 15 and thus inside the hold 2; and
- an off-loading position P2, in which the internal container 4 is longitudinally offset toward the rear of the aircraft AC with respect to the first position P1, so that a part 7 of said internal container 4 is then located outside said external container 15 and outside the transport airplane AC through an opening 8 at the rear of the hold 2.

So, as the system 1 according to the present device, system, and method comprises a single external container 15 being equipped with all the means being necessary for the carrying and the off-loading (particularly one or more internal containers 4 and associated first sliding means 6), it is sufficient to install such an external container 15 in the airplane AC to be able to implement the present device, system, and method. Consequently, a system 1 is obtained, which is simple, which can be realized and installed quickly and which does not need a big modification of the transport airplane AC being used.

Moreover, it can be arranged on any transport airplane type and is not limited to a particular type of ammunition or load.

Furthermore, if connecting means 14 (schematically represented) are provided to fasten the external container 15 on the internal fuselage on the transport airplane AC, which means are easy to remove, the airplane AC can be restored, quickly and at reduced cost, in its initial configuration so that it can fill other types of missions, such as troop and/or vehicle transport.

Moreover, said second sliding means 5 are formed so as to be able to bring the ammunition 3 which is located in the internal container 4, from a resting place to said part 7 of the internal container 4.

Furthermore, said system 1 comprises in addition a dropping control device 31, which is able to control, in particular, said first sliding means 6 and said second sliding means 5, further to controls generated by an operator, and which is arranged in a dedicated area of the transport airplane AC, which can be pressurized.

In a particular embodiment, said internal container 4 comprises a cage 16 equipped with compartments 17 which are able to receive each one or more pieces of ammunition 3. Such compartments 17 can be arranged in rows and/or in columns. In the example of FIGS. 1 and 1 the internal container 4 comprises two sets of compartments arranged in row one above the other.

In a preferred embodiment, the system 1 according to the present device, system, and method is adapted not only for carrying, but also for flight dropping, at least one piece of ammunition 3. In such particular embodiment, the part 7 of the internal container 4, which is located outside the transport airplane AC in the position P2 and in which one piece of ammunition 3 is able to be brought with the help of said second sliding means 5, is a so-called dropping part, whence the piece of ammunition 3 can be dropped in flight from the transport plane AC.

In such a preferred embodiment, said second sliding means 5 comprise rails 10 fastened on the internal container 4 and providing with an ejection device 11, which is able to slide on said rails 10 and which is able to support the ammunition 3 upon carrying and to release it upon dropping.

Consequently, to perform dropping in flight of ammunition 3 carried by the system 1 according to the present device, system, and method, the following operations are implemented:
- from the carrying position P1, i.e. the position which is used upon flight phases (take-off, cruising phase, etc.) other than the dropping phase, for which the internal container 4 is located completely inside the external container 15 and the doors 12 and 13 at the rear of the airplane are closed, an opening of said doors 12 and 13 is usually controlled (pivoting them as illustrated by arrows E1 and E2 on FIG. 1 to bring them in the positions represented in broken lines on this FIG. 1 and forming the opening 8) and, with the help of the dropping control device, the first sliding means 6 are controlled for generating a movement of the whole internal container 4 longitudinally toward the rear of the airplane AC in the direction illustrated by the arrow F1;
- when the internal container 4 is in the position P2, for which the dropping part 7 is located outside the airplane AC, one piece of ammunition 3 is brought in such dropping part 7, with the help of the sliding means 5 (and the dropping control device) and, in such a position, the ejection device 11 is controlled so that it releases (by release and/or ejection) the piece of ammunition 3;
- the former step can be performed for a single piece of ammunition 3 or can be repeated for some or the totality of the ammunition 3 contained in the internal container 4; and
- when the ammunition 3 which was required to be released have been released, the internal container 4 can be restored in its position P1 in the direction illustrated by the arrow F2 and the doors 12 and 13 can be closed again.

So, as in such a preferred embodiment, the dropping part 7 of the internal container 4 can be moved outside the transport airplane AC, a piece of ammunition 3 (brought in that dropping part 7) can be dropped without having to use any extraction means, such as a parachute for example.

Consequently, thanks to such preferred embodiment of the system 1 according to the present device, system, and method, the following advantages are particularly obtained:
- no slowing down of the piece of ammunition 3 after dropping, thereby enabling, in the case of a missile, to stay in the field of pilotability of the missile and starting of the engine thereof. In such a situation, the integration of a missile re-acceleration system is not indispensable;
- no equipment is dropped, unlike a dropping with a parachute, thereby allowing a certain operational discretion; and
- as upon dropping, the dropping part 7 of the internal container 4 is located outside the transport airplane AC, the collision risks of the ammunition 3 with the latter are strongly reduced, and a much more extended dropping field than the usual solution is obtained.

Moreover, the rear end 18 of the internal container 4 including the dropping part 7 is formed such that the lower stage 19 does not disturb the dropping of one piece of ammunition from the upper stage 20, as represented on FIG. 2. To do so, the rails 10 are fastened on the sides of the compartments 17 of the internal container 4.

On the other side, said ejection device 11 stays on the rails 10 after dropping. Consequently, the system 1 comprises a set of rails 10 per piece of ammunition 3. Moreover, an ejection device 11 can be used, which is similar to a usual ejection device being employed on a fighter. This enables in particular to use the carrying points usually existing on the ammunition and thus limits the modification to be made to the latter.

The invention claimed is:

1. A load-carrying system for a transport airplane, said system comprising at least one internal container which is able to receive at least one load, the at least one internal container having a first level and a second level above the first level;
   an external container which is able to be fastened, directly and completely, in a hold of the transport airplane, and wherein said at least one internal container is arranged within said external container and movable longitudinally to be brought from one of two positions to the other of the two positions, the two positions being:
   a first position, in which the at least one internal container is completely located inside said external container; and
   a second position, in which the at least one internal container is translated towards the rear of the aircraft with respect to said first position, so that a part of said at least one internal container and a part of said at least one load are then located outside said external container and outside the transport airplane through a plane defined by a perimeter of an opening at the rear of the hold, and said at least one load is droppable while in flight from the second level;
   wherein said at least one internal container is mounted inside said external container using a first sliding means which is able to move said at least one internal container between said first position and a second position;
   wherein a second sliding means is able to bring said at least one load from a part of the at least one internal container that is located inside the transport airplane to the part of said at least one internal container that is located outside the transport airplane when the at least one internal container is in said second position.

2. The system according to claim 1, wherein said at least one internal container comprises a cage equipped with compartments able to receive a plurality of loads, the first and second levels each having a set of one or more second sliding means.

3. The system according to claim 1, further comprising a control device which is able to control at least a first and a second sliding means.

4. The system according to claim 1, provided for carrying and dropping in flight the at least one load, wherein the part of the at least one internal container, which is located outside the transport airplane in said second position, and in which the at least one load is able to be brought with the help of said second sliding means, is a dropping part.

5. The system according to claim 4, wherein said second sliding means comprise rails fastened on the at least one internal container and provided with an ejection device which is able to slide on said rails and which is able to support the at least one load upon carrying and to release the at least one load upon dropping.

6. The system according to claim 5, wherein the rails are fastened on the internal sides of the at least one internal container.

7. The system according to claim 4, further comprising at least one or more additional second sliding means, each of the second sliding means being vertically offset from each other.

8. A load-carrying system for a transport airplane, said system comprising at least one internal container which is able to receive at least one load,
   an external container which is able to be fastened, directly and completely, in a hold of the transport airplane, and wherein said at least one internal container is arranged within said external container so as to be able to be moved longitudinally and to be brought from one of two positions to the other of the two positions, the two positions being:
   a first position, in which the at least one internal container is completely located inside said external container;
   a second position, in which the at least one internal container is longitudinally offset toward the rear of the aircraft with respect to said first position, so that a part of said at least one internal container is then located outside said external container and outside the transport airplane through an opening at a rear of the hold;
   a first sliding means which is able to move said at least one internal container between said first position and said second position; and
   a plurality of second sliding means which is able to bring said at least one load from a part of the at least one internal container that is located inside the transport airplane to the part of said at least one internal container that is located outside the transport airplane when the at least one internal container is in said second position, each of the second sliding means being vertically offset from each other, the at least one load being droppable while in flight.

9. The system according to claim 8, wherein said at least one internal container comprises a cage equipped with compartments able to receive a plurality of loads.

10. The system according to claim 8, further comprising a control device which is able to control at least the first and the second sliding means.

11. The system according to claim 10, provided for carrying and dropping in flight the at least one load, wherein the part of the at least one internal container, which is located outside the transport airplane in said second position, and in which the at least one load is able to be brought using said second sliding means, is a dropping part, whence the at least one load can be dropped from the transport airplane in flight.

12. The system according to claim 11, wherein the control device is able to control dropping of the at least one load.

13. The system according to claim 8, wherein the at least one internal container comprises a cage equipped with compartments, each of which is able to receive one or more pieces of ammunition.

14. The system according to claim 12, wherein the control device is programmed to drop a single load.

15. The system according to claim 12, wherein the control device is programmed to drop one load or to drop a predetermined number of loads up to all the loads carried by the aircraft.

16. The system according to claim 8, wherein the at least one internal container can store the at least one load on two different vertical levels, each level having a set of one or more second sliding means, the at least one load being droppable from an upper level of the two levels.

* * * * *